Aug. 2, 1927.
H. G. GILES
1,637,815
TIRE MOUNTING AND DISMOUNTING DEVICE
Filed Oct. 19, 1926
2 Sheets-Sheet 1
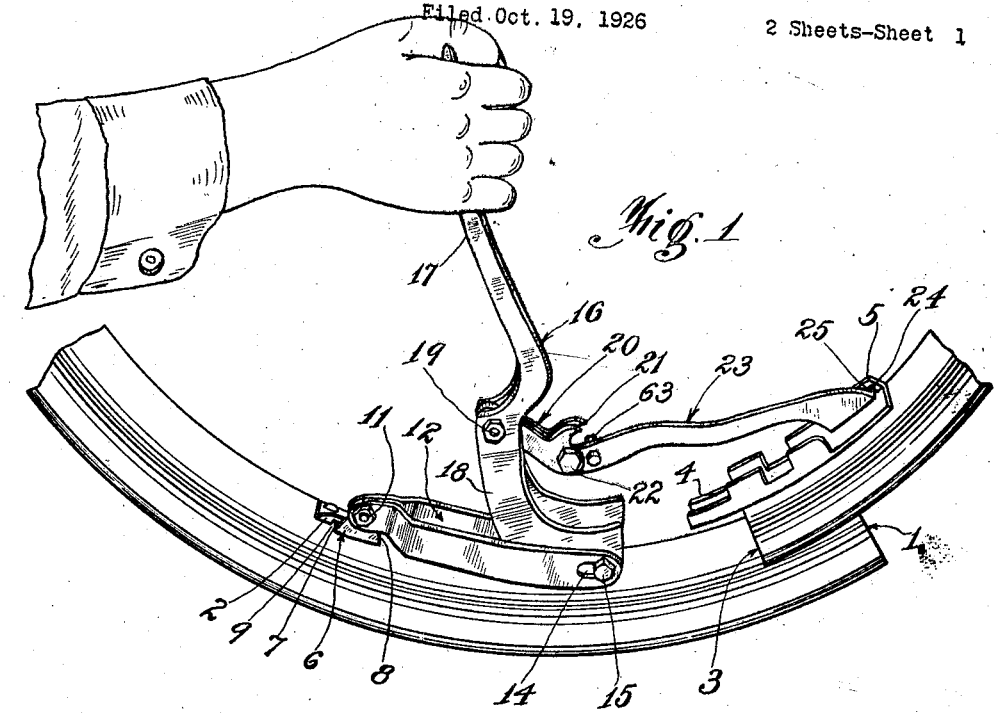
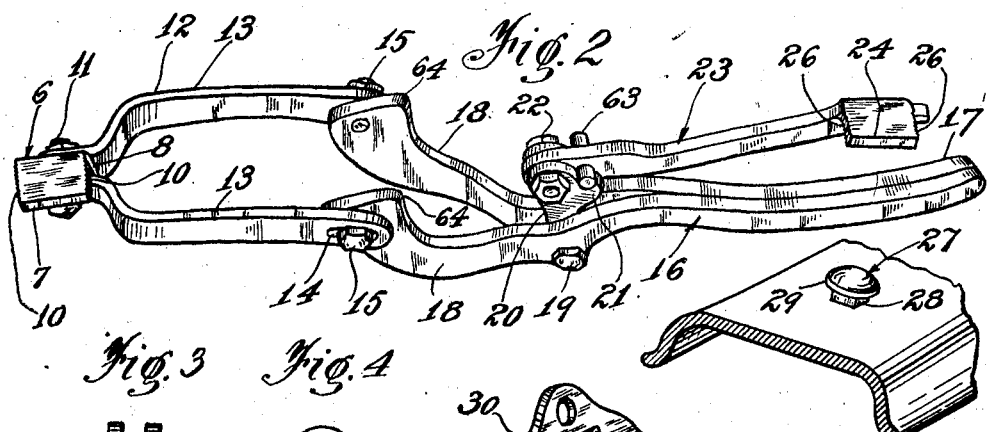
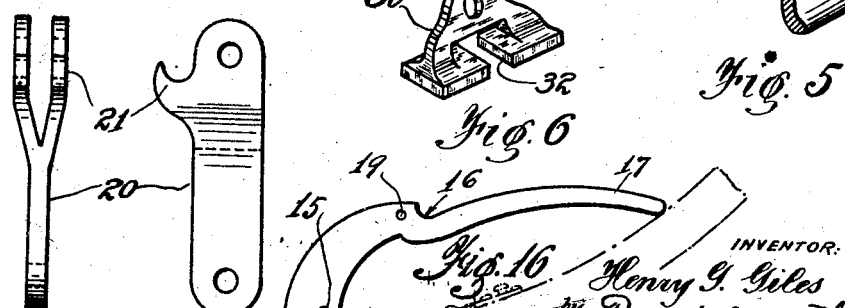
INVENTOR.
Henry G. Giles
by Ralph Donath
Paul Purchard
Attorneys Aug. 2, 1927.
H. G. GILES
1,637,815
TIRE MOUNTING AND DISMOUNTING DEVICE
Filed Oct. 19, 1926     2 Sheets-Sheet 2
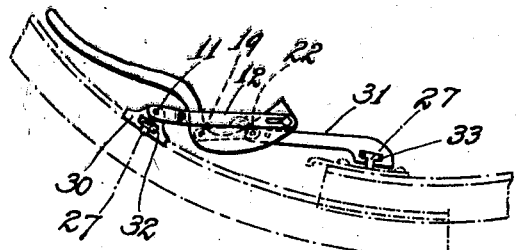
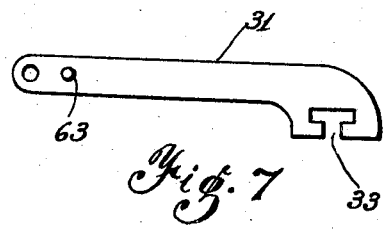
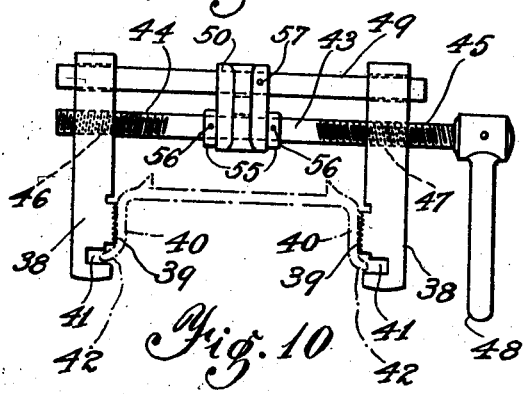
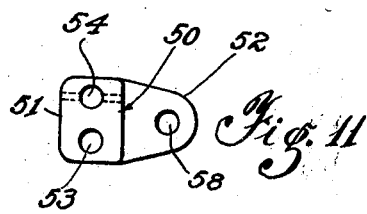
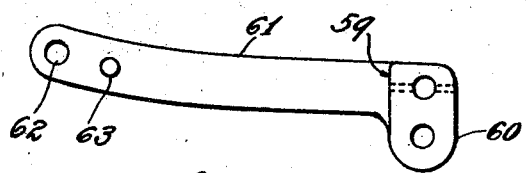
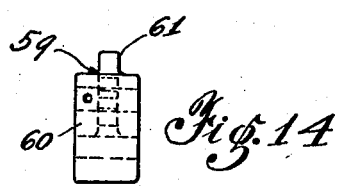
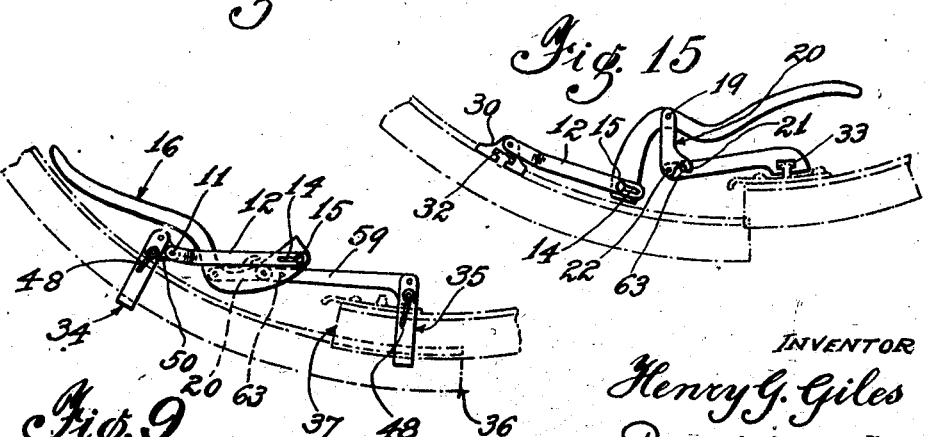
INVENTOR
Henry G. Giles
by Ralph Donath
Paul Purchard
Attorneys Patented Aug. 2, 1927.

1,637,815

UNITED STATES PATENT OFFICE.

HENRY G. GILES, OF PITTSBURGH, PENNSYLVANIA, ASSIGNOR OF ONE-HALF TO WILLIAM H. McFARLAND, OF PITTSBURGH, PENNSYLVANIA.

TIRE MOUNTING AND DISMOUNTING DEVICE.

Application filed October 19, 1926. Serial No. 142,593.

This invention relates to tire mounting and dismounting devices adapted especially for pneumatic tires mounted on so-called split-rims.

This application is directed to cover certain improvements over similar devices disclosed by me in a prior application for Letters Patent bearing the Serial Number 57,564 and filed September 21, 1925.

One of the main objects of this invention is to provide a tire mounting and dismounting device which is adapted for use on all commercial split-rims now in use. Another object is to provide such a device which is adapted to lift one end of a split-rim above the other end prior to overlapping said ends for the purpose of constricting the rim a sufficient amount to enable the mounting or dismounting of a tire on said rim with ease and speed. A further object is to provide a device which is relatively small and light and which, therefore, is well suited to be carried as part of the tool equipment of every automobile. Yet another object of this invention is the provision of a device which is simple in application and which is self-locking when the tire rim is constricted to its full required amount. Additional features and advantages of this invention will appear from the following description considered in connection with the accompanying drawings forming a part of this application.

In the drawings:—

Fig. 1 is a perspective view showing the application of my improved device on a certain commercial type of split-rim.

Fig. 2 is a perspective view showing my device in an inverted position.

Fig. 3 is a front elevation of the so-called hook-link used in my device.

Fig. 4 is a side elevation of Fig. 3.

Fig. 5 is a fragmentary view of a rim provided with a special hitch-pin to which my device may be attached.

Fig. 6 is a perspective view of an anchor designed to cooperate with a rim of the modified type shown in Fig. 5.

Fig. 7 is a side elevation of the hitch-link also used in connection with the rim shown in Fig. 5.

Fig. 8 is a view showing a rim fully constricted by my device and the latter in self-locking position.

Fig. 9 is a similar view, but showing my device provided with a set of universal rim-clamps.

Fig. 10 is a front elevation of one of the two universal rim-clamps used in Fig. 9.

Figs. 11 and 12 are respectively the side elevation and the top view of the hitch-block used on one of the universal rim-clamps.

Figs. 13 and 14 represent the side elevation and the end-view of the hitch-link used on the other universal rim-clamp.

Fig. 15 shows the position taken by the device after the constricted end of the rim has been released and returned, by its own elasticity, nearly into normal position.

Fig. 16 is a side-elevation of the operating lever, showing especially the cam-shaped form of the foot of said lever.

Reference being had to Fig. 1, on the substantially stationary rim end 1 there is provided a special hitch 2, and on the movable rim end 3 there is added to the usual rim-lock 4 another hitch 5. The tire mounting and dismounting device illustrated in this figure comprises an anchor 6 having a hitch-lug 7 and a rectangularly disposed tab 8. This hitch-lug is adapted to fit snugly within the rectangular slot 9 provided in the hitch 2 and, to insure a better engagement of the lug into said slot, the former is preferably provided on two sides with sharp teeth or corrugations 10.

Hingedly connected to the tab 8 by means of the bolt 11 is the draw-bar 12 consisting of straps 13 suitably bent to assume the shape shown in the drawing. At the free ends of the draw-bar are cut oblong slots 14 which are engaged by the pivot-bolts 15 upon which is rockably mounted the operating-lever 16. The latter is composed of a suitably shaped handle 17 and of the two curved legs 18 at the feet of which the pivot-bolts 15 are solidly fastened. As shown in Fig. 16 especially, these feet are cam-shaped and the distance of the heel 64 from the center of the pivot-bolt is determined by the amount of straight lift desired at the movable end of the rim.

Adjacent the bend formed by the handle and the legs there is passed a bolt 19 which acts as a pivot for the so-called hook-link 20 which is preferably made of two similar pieces of metal each of which is provided with an integral hook 21. Hingedly connected to the hook-link by means of the bolt 22 is the hitch-link 23 having at its free end the rectangularly disposed lug 24 which is adapted to fit snugly in the rectangular aperture 25 cut in the extension of the rim-lock 4. Sharp teeth or corrugations 26 are also provided at two sides of said lug to prevent any accidental slipping thereof.

In the modified construction illustrated in Fig. 8 and detailed in Figs. 5 to 7, the rim has been provided at each end with special hitch-pins 27 which are riveted to the rim and which comprise a square or rectangular shank 28 and the head 29. As shown in Figs. 6 and 7, the anchor 30 and the hitch-link 31 have been provided with T-shaped open slots 32 and 33 respectively which are adapted to fit about the head and shank of each hitch-pin.

The aforementioned constructions of my device require a slight modification of the tire rims now in use, by adding thereto the hitch-lugs or hitch-pins above described. In view of the great number of various types of split-rims in the trade, such requirement might prove a handicap in the commercial development of my invention, especially as regards automobile repair shops where a great number of my devices would have to be kept on hand to accommodate the various types of split-rims met with in the business. To overcome this inconvenience, I have also devised a universal device which differs from the ones already described only in the means used for attaching it to the rims to be constricted.

By referring to Fig. 9, it will be noted that this modified device is removably secured to both ends of a split-rim by means of the two identical clamping devices 34 and 35, which are respectively clamped on the stationary rim-end 36 and on the movable rim-end 37.

Each universal clamping device consists of two parallel and identical jaw-members 38 upon the lower ends of which have been machined the corrugated surfaces 39 by which the flat outside portions of the rim-flanges 40 are gripped, and the grooves 41 which are adapted to freely receive the beaded portions 42 of said rim-flanges. These jaw-members are clamped tightly against the flanges of the rim by means of a spindle 43 upon which are cut the left threads 44 and the right threads 45 which engage accordingly threaded holes 46 and 47 drilled in the jaw-members. A handle 48 is also placed at one end of the spindle to enable the rotation thereof and the consequent travel in opposite directions of the jaw-members. The latter are maintained in the proper, juxtaposed, position by means of a guide-rod 49.

The clamping device 34 carries the hitch-block 50 which comprises a body portion 51 and an attachment lug 52. In the body portion are drilled the apertures 53 and 54 which are respectively engaged by the rotatable spindle 43 and the guide-rod 49. The hitch-block is held centrally on the spindle by means of collars 55 secured on said spindle in any desired manner, such as by the pins 56. On the other hand, the guide-rod is kept from moving longitudinally by means of a pin 57 driven through the body portion 51 and the guide-rod. In the attachment lug is the hole 58 in which is inserted the bolt 11 of the draw-bar 12.

On the clamping device 35 is mounted the hitch-bar 59 which consists of the body portion 60 and the arm 61. The body portion is drilled for securement on the spindle 43 and the guide-rod 49 in an identical manner as the hitch-block. Adjacent the end of the arm is drilled the hole 62 in which is inserted the bolt 22 which pivotally connects said hitch-bar to the hook-link 20.

On each of the hitch-links described above, there is secured the hook-pin 63 which extends on both sides of said links and which is properly located to fit in the socket of the hook 21, when the tire mounting and dismounting device assumes the position shown in Fig. 15.

Based on the above description, the application and operation of my device will be readily comprehended by those versed in the art and may be briefly explained as follows:

Assuming, for instance, that the device be of the type adapted to accommodate the style of rim shown in Fig. 1 and that a tire is to be removed for renewal or repair, the following must be done: The rim and the tire are first removed from the wheel and the rim-lock is opened in the usual manner. The rectangular lugs on the anchor 6 and the hitch-link 23 are inserted in the slots of their corresponding hitches, so that the operating-lever 16 will lie partly over the movable rim-end. It will be noted also that the pivot-bolts 15 of the operating-lever occupy the extreme left end of the slots 14 in the draw-bar 12, as shown in particular in Fig. 15. The operator now rotates the lever counterclockwise with the result that the end of the hitch-link, and the movable rim-end, are lifted up. This motion of the operating-lever would also have the tendency to move the rim-end to the left and constrict it, but the resistance to bending of the latter causes the pivot-bolts to move to the extreme right of the slots 14 instead, so that, for the time being, the movable rim end is not constricted, but only lifted high enough to clear the stationary rim-end 1. Any further counterclockwise rotation of the operating-lever now occurs with the pivot-bolts bearing against the right ends of the slots 14 so that the rim is gradually constricted until the operating-lever occupies the position illustrated in Fig. 8. As shown therein, the pivot-bolts lie well above the imaginary line passing through the centers of the hinge-bolts 19 and 22 and, for that reason, the whole device is locked automatically, regardless of the pull exerted by the constricted portion of the tire-rim. This constricted condition permits of the easy removal of the old tire and the application of a new one.

After the new tire has been placed on the rim, the operating-lever is lifted out of its self-locking position, and the elasticity of the constricted rim portion will cause the latter to open up and assume nearly its normal position. However, the presence of the tire on the rim does not allow the full return of the constricted rim portion, the latter will be stopped a short distance inward from the end of the stationary rim portion, substantially as shown in Fig. 15.

In order to place the end of the movable rim portion in its final position, it is necessary to exert pressure on the operating-lever in a clockwise sense. This brings the sockets of the hooks 21 to bear upon the hook-pin 63 so that the hook-link and the hitch-link are substantially rigidly connected. The pivot-bolts 15 are now at the extreme left of the slots 14 and any pressure imposed on the operating-lever will act in a greatly multiplied intensity upon the movable portion of the rim and force the latter into final position.

As will be understood from the above description, the amount of direct vertical lift of the end of the movable rim-half is determined by the length of the slots 14 and by the lift of the cam-shaped foot of the operating-lever. Also, the total constriction of the rim is governed by the direct distance between the centers of the pivot-bolts 15 and the hinge-bolt 19.

Apart from the manner of applying the modified constructions shown in Figs. 8 and 9, their operation is substantially the same as stated above, and for that reason, further comment on the subject is not thought necessary.

While I have illustrated and described various embodiments of my invention which I have found by actual use to be very practical, it may be thought desirable after continued experience to make slight changes in the construction and arrangement of the details of my invention, and I intend to include in this application all such changes as fall within the scope of the appended claims.

I claim:—

1. In a device for mounting and dismounting a tire on or off a split-rim, an anchor adapted for securement to a hitch positioned on one end of said rim; a hitch-link adapted to be secured on another hitch positioned on the other end of said split-rim; a draw-bar hingedly connected to said anchor; an operating-lever hingedly mounted on said draw-bar; a hook-link pivotally mounted on said operating-lever, and means for hingedly connecting said hook-link to said hitch-link.

2. In a device for mounting and dismounting a tire on and off a split-rim, an anchor adapted for securement to a hitch positioned on one end of said rim; a hitch-link adapted to be secured on another hitch positioned on the other end of said split-rim; a hook-pin positioned on said hitch-link; a draw-bar hingedly connected to said anchor; an operating-lever; means for hingedly and slidably connecting said operating-lever to said draw-bar; a hook-link pivotally mounted on said operating-lever; hooks positioned on said hook-link and adapted to be engaged by said hook-pin, and means for hingedly connecting said hook-link to said hitch-link.

3. In a device for mounting and dismounting a tire on or off a split-rim, an anchor adapted for securement to a hitch positioned on one end of said rim; a hitch-link adapted to be secured on another hitch positioned on the other end of said split-rim; a draw-bar hingedly connected to said anchor, said draw-bar consisting of two straps having oblong slots at the free ends thereof; an operating-lever comprising a handle and a pair of curved legs each having a cam-shaped foot; pivot-bolts secured eccentrically in the feet of the operating-lever and engaging the slots in the draw-bar; a hook-link pivotally mounted on said operating-lever, and means for hingedly connecting said hook-link to said hitch-link.

4. In a device for mounting and dismounting a tire on or off a split-rim, an anchor adapted for securement to a hitch positioned on one end of said rim; a hitch-link adapted to be secured on another hitch positioned on the other end of said split-rim; a draw-bar hingedly connected to said anchor; said draw-bar comprising two straps having oblong slots at the free ends thereof; an operating-lever comprising a handle and a pair of curved legs each having a cam-shaped foot; pivot-bolts secured eccentrically in the feet of the operating-lever and engaging the slots in said draw-bar; a hook-pin positioned on said hitch-link; a hook-link mounted pivotally on said operating-lever; hooks positioned on said hook-link and adapted to be engaged by said hook-pin, and means for hingedly connecting said hook-link to said hitch-link.

In testimony whereof I affix my signature.

HENRY G. GILES.